(12) United States Patent
Schneweis

(10) Patent No.: US 6,596,340 B1
(45) Date of Patent: Jul. 22, 2003

(54) METHOD OF REGULATING A HIGH TEMPERATURE GASEOUS PHASE PROCESS AND USE OF SAID METHOD

(75) Inventor: Stefan Schneweis, Grävenwiesbach (DE)

(73) Assignee: Schunk Kohlenstofftechnik GmbH, Heuchelheim (DE)

( * ) Notice: Subject to any disclaimer, the term of this patent is extended or adjusted under 35 U.S.C. 154(b) by 0 days.

(21) Appl. No.: 09/890,267

(22) PCT Filed: Feb. 9, 2000

(86) PCT No.: PCT/EP00/01047
§ 371 (c)(1),
(2), (4) Date: Oct. 5, 2001

(87) PCT Pub. No.: WO00/48051
PCT Pub. Date: Aug. 17, 2000

(30) Foreign Application Priority Data

Feb. 10, 1999 (DE) .......................................... 199 05 480
Apr. 20, 1999 (DE) .......................................... 199 17 821

(51) Int. Cl.[7] .............................................. C23C 16/32
(52) U.S. Cl. .................. 427/10; 427/249.2; 427/249.16
(58) Field of Search ........................... 427/248.1, 8, 10, 427/249.2, 249.16

(56) References Cited

U.S. PATENT DOCUMENTS

| 5,014,217 A | | 5/1991 | Savage |
| 5,060,572 A | | 10/1991 | Waizmann |
| 5,079,600 A | * | 1/1992 | Schnur et al. .................. 357/4 |
| 5,087,815 A | * | 2/1992 | Schultz et al. ............... 250/309 |
| 5,368,118 A | | 11/1994 | Hoefle |
| 5,776,254 A | | 7/1998 | Yuuki et al. |
| 5,807,750 A | | 9/1998 | Baum et al. |
| 5,925,494 A | * | 7/1999 | Horn ....................... 430/270.1 |
| 5,968,467 A | | 10/1999 | Karasek |
| 6,153,061 A | * | 11/2000 | Tzeng et al. ........... 204/192.16 |
| 6,358,863 B1 | * | 3/2002 | Desu et al. .................. 438/763 |

FOREIGN PATENT DOCUMENTS

EP  0549207  6/1993

* cited by examiner

*Primary Examiner*—Bret Chen
(74) *Attorney, Agent, or Firm*—Dennison, Schultz & Dougherty

(57) ABSTRACT

A method of regulating a high temperature gas phase process on the basis of a measurement curve determined by means of infrared spectroscopy, the curve having at least one spectral peak which is characteristic for the regulation of the process and which deviates from a background of the measurement curve. A straight line synthetic background is calculated directly from the measurement curve on the basis of initial and end values of the characteristic spectral peak, and the peak is integrated over the straight line, or a maximum height of the peak over the straight line, or another characteristic value of the peak relative to the straight line is utilized. The process is regulated based on measured peak and the synthetic background.

14 Claims, No Drawings

METHOD OF REGULATING A HIGH TEMPERATURE GASEOUS PHASE PROCESS AND USE OF SAID METHOD

BACKGROUND OF THE INVENTION

The invention relates to a method for regulating a high temperature gas phase process, in particular CVD, LPCVD (Low Pressure Chemical Vapour Deposition) or CVI, on the basis of measurement curves, determined by infrared spectroscopy, which have at least one spectral region (peak) characteristic for the regulation of the process and differing from the background of the measurement curve.

Usually, chemical compounds have highly specific infrared spectra which are more finely structured than spectra in the visible or ultraviolet regions. Consequently, infrared spectra frequently serve to assist the qualitative analysis in the identification of chemical compounds, whereby a measured spectrum, which contains the chemical compounds of interest, is compared with a so-called reference spectrum and, by quotient formation/division of the spectra, further absorption spectra are obtained which enable identification of the chemical compounds under examination.

As the spectral regions, which are characteristic for the chemical compounds, i.e. peaks, vary substantially in dependence on temperature, it is necessary that, for each temperature at which a process is carried out, a reference curve is determined. The same holds true when infrared spectra have to be measured and evaluated in different installations.

From U.S. Pat. No. 5,175,017 or JP 07-90593A or JP 03-193863A, process regulation by means of EDV evaluation of spectrometer values is known. An overview of the process regulation possibilities, which also include the spectroscopy, can be obtained from the United States Journal of Vacuum Science Technology B13(4) July/August 1995, 1917–1923. U.S. Pat. No. 4,148,931 proposes a process regulation by IR spectroscopy in exhaust gas.

The present invention is based on the problem of developing a process of the first-mentioned type so that, with the assistance of infrared spectroscopy, high temperature gas phase processes, in particular CVD, LPCVD and CVI processes, can be optimally and quickly regulated even at temperatures which vary during the processes, so that the gas phase process is optimized or the accumulation of, in particular, dangerous chemical compounds in exhaust gas flow is reduced.

According to the invention, the problem is solved, essentially, in that a straight line (synthetic background) is calculated directly from the measurement curve on the basis of the initial and end values of the characteristic spectral range (peaks), and in that the regulation of the process occurs by integration of the spectral range above the straight line or by determination of the maximum height of the spectral range over the straight line or on the basis of another characteristic value of the spectral range with respect to the straight line.

It is thereby in particular provided that the measurement curve is smoothed out, i.e. the background noise is strongly minimized, before the calculation of the straight line. The smoothing can be effected in accordance with the formula established by Kinitz $$A_i = \frac{1}{16}(A_{(i-2)} + 4A_{(i-1)} + 6A_{(i)} + 4A_{(i+1)} + A_{(i+2)}),$$

where $A_1$ represents the value to be smoothed (i.e. in the present case the peak) and $A_{(i-x)}$ or $A_{(i+x)}$ the value before or after the value $A_i$.

By the teachings of the invention, the infrared spectrum can be continuously established and evaluated independently of a spectral background which varies with temperature, so that a regulation of the process is possible while avoiding a reference spectrum at each temperature to be measured. Consequently, immediately after the calculation of the straight line, which is equivalent to a synthetic background, relevant parameters of the process can be regulated on the basis of characteristic values obtained between the straight line and the peak. These include the pressure in a reaction vessel, the gas speed of the process gas, the concentration thereof and/or the temperature in the reaction chamber.

SUMMARY OF THE INVENTION

On the basis of the teachings of the invention, it is no longer necessary, after reinstallation, on transferring to other process installations and in particular other or varying temperatures to determine so-called background data banks for the different temperatures before the actual measurements in order to divide the actually measured measurement curves by reference curves thus obtained. Consequently, without any adaptation, the gas composition can be determined even while a process is taking place. This is in particular the case when the positions of the characteristic spectral ranges, i.e. the leading peaks, are known, so that consequently, independent of parameters and also independent of the high temperature gas phase processes to be carried out, an immediate calculation and therewith regulation of the process can occur. In this way, PyC or CVD, LPCVD or CVI installations, e.g. for PyC or SiC coatings, can be optimized or controlled in a problem-free manner.

The method according to the invention can be used, in particular, for regulating a waste, such as a refuse, incineration process, a spectral range of the measurement curve characteristic for an environmentally dangerous gas such as dioxin being the basis for regulating values.

In a CVD process (Chemical Vapour Deposition) for surface coating of e.g. carbon or graphite material with silicon carbide, characteristic peaks measured in the exhaust gas flow, such as HCl and/or $CH_4$ and/or $CH_3SiCl_3$ and/or $HSiCl_2$ and/or $SiCl_4$ can preferably be the basis for the regulating values.

For determining the measurement curve, IR radiation emitted from an element such as graphite plate in a reaction container, can be measured, the IR radiation, in particular, emitted through an exhaust gas flow from the reaction vessel being the basis. In this way, by adjustment of the process parameters, it can be ensured that e.g. the amount of polychlorosilanes in the exhaust gas is reduced to such an extent that expensive subsequent treatments are avoided. Also, the separating apparatus can be regulated so that, consequently, the CVD process is optimized by means of the method according to the invention. The same holds true with respect to the optimization of CVI (Chemical Vapour Infiltration) processes and pyrographite coatings (PyC).

The method according to the invention is not, however, restricted to infrared measurements in which the radiation is emitted from a body. Moreover, all known infrared spectroscopy methods employing emission, transmission or reflection spectra can be used.

BRIEF DESCRIPTION OF THE DRAWINGS

Further details, advantages and features of the invention appear not only from the claims, from the features to be obtained therefrom—individually and/or in combination— but also from the following description of the preferred embodiments shown in the drawings.

In the drawings:

FIG. 1 shows a single beam/infrared measurement curve,

FIG. 2 shows a measurement curve with a synthetic background,

FIG. 3 shows an absorption spectrum calculated from the measurement curve of FIG. 2, on the basis of a synthetic background, FIG. 4 shows variations of absorption lines in dependence on temperature in a CVD process for coating carbon or graphite material with SiC, FIG. 5 shows a section of a reaction vessel, and FIG. 6 shows a block diagram.

DESCRIPTION OF THE PREFERRED EMBODIMENTS

To coat e.g. carbon or graphite material with silicon carbide (SiC), a thermal CVD (Chemical Vapour Deposition) method can be used, e.g. $SiHCl_3$ or $SiCl_4$ being reduced in an $H_2$ atmosphere at 900° C. to 1350° C. in a reaction chamber and forming a SiC layer by precipitation onto a substrate. Also, trichlorosilane $CH_3SiCl_3$ (MTS) or $SiH_4$ and methane $CH_4$ can be employed instead of MTS. In this respect, however, long-known CVD methods for SiC coating are referred to.

A measurement curve obtained by FTIR (Fourier Transformation IR Spectrometry) measurement is shown in FIG. 1. The intensity is there plotted against the wave number $cm^{-1}$. Obviously, the wave number can be replaced by the wavelength or the frequency.

From the measurement curve of FIG. 1, it can be seen that this characteristic spectral range includes so-called peaks, which are characteristic for certain chemical compounds. The position of these peaks is known, so that on the basis of the alteration thereof the CVD process can be regulated. According to the state of the art, furthermore, the measurement curves measured at a certain temperature are compared with a reference curve at the same temperature, at which the CVD process is not taking place. From the quotient of the curves, characteristic values of the peaks are obtained in order to be able to reach conclusions with respect to the process.

If the temperature varies during a process, for each temperature then it is necessary to compare a separate reference curve, a so-called background curve, with the actually measured measurement curve, so that consequently an extensive background data bank must be available. Also, when changing installations it is necessary to have corresponding characteristic background, i.e. reference, curves available.

In FIG. 4, there is illustrated, by way of example, the variation of characteristic peaks, in a CVD method for coating carbon or graphite with SiC, for the chemical compounds HCl, $Cl_4$, methyltrichlorosilane (MTS), $HSiCl_3$, $SiCl_2$ and $SiCl_4$. It is known that e.g. the peak which is characteristic for HCl decreases as the temperature increases ($T_1<T_2<T_3<T_4$), while the intensity increases for $SiCl_2$.

According to the invention, it is provided that it is no longer necessary to perform special background measurements, and thus to store reference curves, in order to compare with the actual measurement curves. Furthermore, a so-called synthetic background is calculated from the actually measured measurement curves and this can be used for determining a characteristic value of the spectral range to be examined, i.e. based on the peaks, in order to obtain absorption spectra which can be used for direct regulation of the process.

Thus, in FIG. 2 there is shown an experimentally measured measurement curve 10, the intensity being plotted relative to the wave number. The measurement curve 10 includes two characteristic peaks 12 and 14, which are to be used for controlling or regulating the process. For this purpose, before and after the respective peak 12, 14, measurement points 20, 22, 24, 26, preferably six measurement points, are taken into account, at which a straight line 16, 18 is calculated which, in turn, is equivalent to a synthetic background, thus corresponds to a background of a reference measurement which, at the temperature of the corresponding installation on which the measurement curve of FIG. 2 is based, would be taken and stored From the quotients between the straight lines 16, 18 and the peaks 12, 14, an absorption spectrum is then calculated, which is shown in FIG. 3. In this figure, the heights of the peaks 12, 14 shown in FIG. 2 are plotted against the wave numbers. From the absorption peaks 12, 14, a process regulation can then follow, the peak of the $SiCl_4$ (silicon chloride) being used e.g. in the coating of carbon or graphite with SiC as the characteristic peak and thus, in such a way that minimal values remain in an exhaust gas flow.

Before the calculation of the synthetic background, represented by the lines 16, 18, the measurement curve 10 can be smoothed and, more particularly, following the formula $$A_i = \tfrac{1}{16}(A_{(i-2)} + 4A_{(i-1)} + 6A_{(i)} + 4A_{(i+1)} + A_{(i+2)}),$$

$A_i$ being the value to be smoothed, and thus the value of the peaks 12, 14, and $A_{(i-x)}$ or $A_{(i+x)}$ the individual measurement values 20, 22, 24 and 26 directly before and after the value to be smoothed. Preferably, three values before and three values after each value to be smoothed are used, as indicated in FIG. 2, by way of example, by reference numerals 20, 22 or 24, 26.

A prerequisite for this process is, of course, that the peaks obtained from the measurement curve 10 are associated unambiguously with certain chemical compounds. If the corresponding spectral ranges, referred as lead peaks, are known, a direct regulation of the process from the lead peaks to be evaluated can follow independently of the installation in use. In this way, PyC or CVD, LPCVD or CVI installations, e.g. for PyC or SiC coating, can be optimized or controlled in a problem-free manner.

In FIG. 5, there is shown in section a reaction chamber 28 in which a substrate of carbon or graphite is to be coated with SiC. For this purpose, the reaction chamber 28 is adjusted to a temperature T of e.g. 1300° C. at a pressure of e.g. $<13.33\times10^3$ Pa. In addition, desired amounts of silane, such as methyltrichlorosilane, and hydrogen are introduced into the reaction chamber 28 in order to coat SiC on the graphite or carbon substrate.

To determine the coating of silane on the substrate and also the formation of silicon carbide or the proportion of explosive polychlorosilane in the exhaust gas, there is located beneath an exhaust gas pipe 30 a body, such as graphite plate 32, which assumes the temperature of the reaction chamber, the IR radiation emitted by this body through the exhaust gas pipe 30 being measured by an FTIR spectrometer 34. Following the measurement curve, according to the method of the invention, a synthetic background in the vicinity of the characteristic peaks 12, 14 is then obtained in order to then calculate absorption spectra according to FIG. 3 and, from these, to control the process.

Obviously, values for regulating the process can be deduced from the measurement curve itself after calculating the lines 16, 18.

Therefore, by the method according the invention, peaks 12, 14 are consequently "cut out" from the measurement curve 10, and straight lines are obtained from the initial and end values 20, 22, 24, 26 of the peaks 12, 14, so that with the help thereof the theoretical background in the region of the peaks 12, 14 is calculated. By quotient formation between the synthetic background 16, 18 and the experimentally determined peaks 12, 14, peak heights or peak areas are then determined. Also, for each peak a respective background is calculated, only the actually measured values present immediately at the beginning and the end of the peaks 12, 14 being used for determining the straight lines 16, 18.

By the method according to the invention, a continuous obtaining and evaluation of infrared spectra is possible independently of a spectral background which varies with temperature. Consequently, on the basis of the experimentally actually measured spectrum, regulation of the process itself is possible. In direct dependence on the values deduced, which equal an on-line evaluation, all relevant parameters such as the vessel pressure, gas speed, concentration of the process gases and temperature can then be regulated and controlled.

The teachings of the present invention make it possible that after reassembly or on change of installations or alteration of temperatures, the background data banks required according to the state of the art and which must be available before the actual measurements, do not have to be available. Without any adaptation, while the process is taking place, such as coating, the gas composition can be determined and the process can thereby be controlled.

It is noted that the method according to the invention can be utilized for all, in particular, high temperature gas phase processes, and thus also in CVI (Chemical Vapour Infiltration) processes such as pyrographite coating, an optimal precipitation rate being ensured without altering the structure of the pyrographite. Consequently, on the basis of the teachings of the invention, it is made possible, in a problem-free manner, to control on-line processes for handling high temperature heat exchanger probes, reproduceable results being achievable.

The method according to the invention can, however, also be utilized in other fields, in particular in the field of waste, such as refuse, incineration. Thus, on the basis of the teachings of the invention, the spectral ranges can be observed which correspond to environmentally dangerous gases such as dioxin, in order to control the process on the basis of the extension of the peaks, and thus e.g. to raise the temperature, when on the basis of the peak the proportion of dioxin is evaluated as being impermissible.

In FIG. 6 there is shown block diagram. With an FTIR spectrometer 34, an infrared spectrum with peaks, characteristic for a reaction chamber 36, is determined, in order to determine, in an evaluation unit 38, a synthetic background by calculating a straight line from measurement values located before and beyond the respective peak. From the calculated characteristic values between the respective straight lines and peaks, such as areas (integral) or peak heights, process parameters in the reaction chamber 34 are regulated by means of a control/regulation unit 40. In addition, by the control/regulation unit 40, units indicated by reference numeral 42 for changing the temperature in the reaction chamber 36, the pressure in the reaction chamber 36 or the proportion of the process gases can be controlled.

What is claimed is:

1. A method of regulating a high temperature gas phase process on the basis of a measurement curve determined by means of infrared spectroscopy, the curve having at least one spectral peak which is characteristic for the regulation of the process and which deviates from a background of the measurement curve, comprising the steps of:

calculating a straight line synthetic background directly from the measurement curve on the basis of initial and end values of each characteristic spectral peak, integrating the peak over the straight line, determining a maximum height of the peak over the straight line or utilizing another characteristic value of the peak relative to the straight line, and regulating the process based on measured peak and the synthetic background.

2. A method according to claim 1, wherein the regulation of the process takes place by continuous establishment and evaluation of measurement curves.

3. A method according to claim 1 wherein an on-line evaluation of the peak is effected for adjustment of at least one of the process parameters pressure, temperature, speed or concentration and process gases.

4. A method according to claim 1, wherein evaluation of the measurement curve takes place without being based on a reference measurement at a temperature which corresponds to that of the process to be regulated.

5. A method according to claim 1, wherein X initial values and Y end values of a peak are used for calculation of the straight line.

6. A method according to claim 5, characterized in that 5 to 7 initial values, and 5 to 7 end values, of the peak are used as a basis for the calculation of the straight line.

7. A method according to claim 5, wherein X and Y are equal.

8. A method according to claim 1, wherein a plurality of peaks is used and each peak is based on a separate straight line.

9. A method according to claim 1, wherein the measurement curve is determined by IR radiation emitted from an element present in a reaction chamber.

10. A method according to claim 9, wherein IR radiation of the element, emitted through an exhaust channel of the reaction chamber, is measured.

11. A method according to claim 9, wherein the element is a graphite plate.

12. A method according to claim 1 for regulating a CVD process for surface coating of carbon or graphite material with SiC, wherein at least one peak characteristic for at least one compound selected from the group consisting of HCl, $CH_4$, $CH_3SiCl_3$, $HSiCl_3$ and $SiCl_4$ is used as a basis for regulating values.

13. A method according to claim 1 for regulating a waste or refuse incineration process, wherein at least one peak, which is characteristic of an environmentally dangerous gas is used as a basis for the regulating values.

14. A method according to claim 1, wherein the high temperature gas phase process is CVD, LPCVD or CVI.

* * * * *